3,151,159
REACTION OF ACETYLENE WITH AMINES
Israel A. David, Wilmington, Del., assignor to E. I. du Pont de Nemours and Company, Wilmington, Del., a corporation of Delaware
No Drawing. Filed Dec. 12, 1962, Ser. No. 244,018
7 Claims. (Cl. 260—563)

This invention relates to new coupling reactions of acetylene to amines. More particularly this invention relates to a process for preparing carbon-to-carbon addition compounds of an acetylenic compound and amines.

Among the reactions of acetylene which have been extensively studied are those in which the acetylene functions as a vinylating agent. Alcohols add successfully to acetylene in the presence of alkaline catalysts to form the corresponding vinyl ethers. However, the preparation of carbon-to-carbon addition products of acetylenic compounds and amines have not heretofore been achieved.

It is an object of this invention to provide a process for preparing carbon-to-carbon addition compounds of an acetylenic compound and amines. A further object is to prepare valuable chemical products from inexpensive acetylene and an amine. Other objects will appear hereinafter.

These and other objects of this invention are accomplished by the following process which comprises heating and reacting in contact with a dialkyl peroxide catalyst at a temperature of at least 50° C., as the only reactants, an acetylenic compound under a pressure of at least 100 lb./sq. in. and a primary amine having the —$NH_2$ group bonded directly to a carbon bearing at least one hydrogen atom.

In practice a pressure reactor is charged with the amine and free-radical generating compound. The reactor is cooled to —80° C., swept with oxygen-free nitrogen, and then evacuated. The reactor is then pressured with the acetylene so that at a temperature which is at least 50° C. the pressure is in excess of 100 lb./sq. in. After reaction is complete, as evidenced by cessation of pressure drop, the reaction mixture is permitted to cool to ambient room temperature, unreacted gaseous reactants are vented, the reactor is opened, and the contents are discharged. The desired product is isolated from the reaction mixture by distillation or other methods known to those skilled in the art.

The examples which follow illustrate this invention. Unless otherwise stated, the reactor employed was of 400 ml. capacity.

EXAMPLE I

A 500-ml. stainless steel pressure reactor is purged with nitrogen and charged with 50 grams of 1,4-diamino cyclohexane (distilled at 121° C. and 37 mm. mercury pressure) and 6 grams of ditertiary butyl peroxide. The reactor is cooled to 0° C., purged with nitrogen, evacuated to 10 mm. pressure and pressured with a small amount of acetylene. The temperature is brought up to 150° C. and the pressure of acetylene is brought to 200 p.s.i. The pressure reactor is shaken at 150° C. for 6 hours while the pressure is maintained between 190 and 205 p.s.i. by supplying acetylene. At the end of this period the reactor is cooled to room temperature and the pressure is reduced to atmospheric. The reaction mixture is distilled in an 18-inch spinning band distillation column at 5 mm. mercury pressure. The fraction distilling below 74.0° C. consists mainly of unreacted 1,4-diaminocyclohexane. The fraction distilling between 74.0 and 85.0° C. is collected. This fraction is redistilled in a spinning band distillation column at 2 mm. mercury pressure. Two fractions are collected: fraction I distilling between 69.4 and 71.7° C. and weighing 4.6 grams; fraction II distilling between 71.7 and 71.8° C. and weighing 2.4 grams. Gas chromatographic analysis indicates that the fractions contain materials of the following structures:

Fraction I

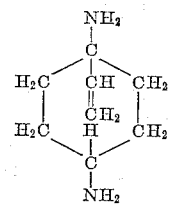

1-vinyl-1,4-diamino cyclohexane

Fraction II

1,4-diamino(2,2,2)bicyclooctane

For further identification a part of fraction I is acetylated with acetic anhydride in benzene solution at room temperature for three hours. A tan-colored solid product is collected upon filtration. After recrystallization from acetone, colorless needles are obtained melting at 245–247° C.

Analysis.—Calculated for $C_{12}H_{20}N_2O_2$: C=64.3; H=9.0; N=12.5. Found: C=64.4; H=8.9; N=12.6

A part of fraction II is acetylated by treatment with acetic anhydride in 20% aqueous potassium hydroxide solution. After recrystallization from acetone solution a white crystalline solid is obtained, with a melting point of 230–231° C.

Analysis.—Calculated for $C_{12}H_{20}N_2O_2$: C=64.3; H=9.0; N=12.5. Found: C=64.6; H=9.1; N=12.2.

EXAMPLE II

A 500-ml. stainless steel pressure reactor with glass liner especially designed to fit the reactor, is purged with nitrogen and charged with 50 grams of 1,4-diamino cyclohexane (distilled at 121° C. and 37 mm. mercury pressure), 6 grams ditertiary butyl peroxide and 40 grams cyclohexane. The reactor is cooled to 0° C., purged with nitrogen, evacuated to 10 mm. pressure and pressured with a small amount of acetylene. The temperature is brought up to 130° C. and the pressure of acetylene is brought to 150 p.s.i. The pressure reactor is shaken for 12 hours, while the pressure is maintained between 120 and 180 p.s.i. by supplying acetylene. At the end of this period the reactor is cooled to room temperature and the pressure is reduced to atmospheric. The reaction mixture is distilled in an 18-inch spinning band distillation column at 5 mm. mercury pressure. The fraction distilling below 74.0° C. consists of cyclohexane solvent and unreacted 1,4-diaminocyclohexane. The fraction distilling beween 74.0 and 85.0° C. is collected and weighs 7.0 grams. This latter fraction is redistilled and analyzed as in Example I with similar results.

EXAMPLE III

A stainless steel pressure reactor is charged with 80 g. of isopropylamine ($n_D^{25}$ 1.3702) and 4 ml. of ditertiary butyl peroxide. Acetylene is then injected at a temperature at or just below room temperature. The reactor is closed and the reaction mixture heated for 1.5 hours at 135° C. The pressure develops corresponding to about 600 lb./sq. in.

The product from the above test run is combined with that from a duplicate test run and the composite distilled. There are obtained 91 g. of isopropylamine and a 13.5 g. fraction distilling at 48–80° C. (mostly 74–77° C.). $n_D^{25}$ 1.4032. This material is subsequently shown to be α α-dimethyl allylamine and is obtained in 6% yield and 19% conversion. There is also obtained a fraction, B.P. 75–170° C./10–11 mm. weighing 6.0 g., $n_D^{25}$ 1.4953, which is subsequently shown to contain some α,α,α',α'-tetramethyltetramethylenediamine, and 5 g. of nonvolatile residue, believed to be an isopropylamine/acetylene telomer.

Analysis of α,α-dimethyl allylamine: B.P. 73–74° C., $n_D^{25}$ 1.4103. Calculated for $C_5H_{11}N$: C=70.5; H=13.0; g. $H_2$/g. sample=0.023. Found: C=69.1; H=13.2; g. $H_2$/g. sample=0.021.

The infrared and n-m-r (nuclear magnetic resonance) spectral data are in accord with the proposed structure.

The yield of α,α-dimethyl allylamine is raised to 60%, at 28% conversion, by using a glass liner within the reactor and by pretreating the isopropylamine with ditertiary butyl peroxide for 5 hours at 135° C., followed by careful fractionation.

EXAMPLE IV

Example III is repeated except that 100 grams of ethylamine and 5 grams of ditertiary butyl peroxide is charged to the pressure reactor. The pressure reactor is then shaken at 135° C. for 8 hours while the pressure is maintained between 375 and 450 p.s.i. by supplying acetylene. Another run with 60 grams of ethylamine and 10 grams of ditertiary butyl preoxide is carried out with the pressure reactor shaken at 135–138° C. for 8 hours while the pressure is maintained between 450 and 525 p.s.i. by supplying acteylene. The combined product of these two runs is 10.6 grams of crude α-methyl allylamine.

EXAMPLE V

Example II is repeated except that 50 grams of methylamine and 5 grams of ditertiary butyl peroxide are charged and the pressure reactor is shaken at 130–135° C. for 8 hours while the pressure is maintained between 1010 and 1040 p.s.i. by supplying acetylene. The second run combines 50 grams of methylamine with 4 grams of ditertiary butyl peroxide and the pressure reactor is shaken at 135° C. for 8 hours while the pressure is maintained between 530 and 600 p.s.i. by supplying acetylene. The combined product of these two runs is distilled, and the fraction collected at 50–80° C., weighs 5 grams, and contains 28% allylamine in t-butyl alcohol.

The initiators used in the process of this invention are the known dialkyl peroxides of general formula ROOR in which R is an alkyl radical preferably of no more than ten carbon atoms. Examples of such compounds are ditertiary amyl peroxide, dibutyl peroxide, tertiary butyl pentamethylpropyl peroxide, ditertiary butyl peroxide, and the like.

The above dialkyl peroxides are employed in catalytic amounts, i.e., in proportions which are at least 0.1% by weight of the reactants. Generally however, amounts in the range of 2–20% are employed since within this range good reaction rates with good yields of desired products are realized.

In place of the specific acetylene of the detailed examples there can be used any acetylenic compound corresponding to the formula R—C≡C—H, in which R is selected from the class consisting of hydrogen, and alkyl radicals, especially of not more than 12 carbon atoms. Examples of such radicals are methyl, ethyl, octyl, decyl, dodecyl, and the like. Acetylenic compounds within the purview of this invention are the alkynes, such as acetylene, methyl-acetylene, 2-decyne, and the like.

The primary amines employable in the process of this invention are alkylamines and cycloalkylamines which have the —$NH_2$ group attached directly to a carbon bearing at least one hydrogen atom, said amine preferably containing up to 20 carbon atoms.

Typical suitable amines include: methylamine, ethylamine, isopropylamine, 1-ethyl propylamine, 1-butyl pentylamine, 1-ethyl decylamine, 1-cyclohexyl propylamine, 1-methyl cyclohexyl propylamine, 2,5-diaminohexane, 1,2-diamino cyclohexanes, 1,3-diamino cyclohexanes, 1,4-diamino cyclohexanes, and the like.

The resulting amines are useful as polymer intermediates. The diamines may be reacted with dicarboxylic acids in the conventional polyamide synthesis. Monoamines find application as resin intermediates. Monoallylamine can be reacted with ethylene oxide yielding a derivative that may be considered as a polyurethane intermediate that functions as a polyol, yet has double bonds available for subsequent cross linking. It also may be incorporated in acrylonitrile polymers to improve the dyeability.

In the reaction between the acetylene and amine, equivalent amounts of the reactants are consumed. In practice, the reactor is charged with the amine and the acetylene is then added to provide a pressure of at least 100 lb./sq. in. at reaction temperature. The pressures used are in the range of 100 to 700 lb./sq. in. and the temperatures at least 50° C. and usually in the range of 75° to 175° C.

If desired, the amine can be used in excess of the theoretically required amount. In such case, the excess simply functions as a reaction medium.

Although not necessary because, as pointed out above, the amine can also function as a reaction medium, there can be used an inert reaction medium. Suitable media are cyclohexane, isooctane, t-butyl alcohol, and the like.

The amount of reaction medium is not critical and it can be varied over wide limits. Generally it is at least equal to the weight of the acetylene and amine charged into the reactor. Amounts of reaction medium which are several fold in excess of the combined weights of the acetylene and amine may be used and in some cases this has advantages in minimizing formation of undesired side reaction products.

The reaction between the acetylene and amine can be conducted as a batch operation or as a semicontinuous or continuous process. In practice a continuous process has practical advantages because it makes it possible to recover unreacted reactants for recirculation into the reaction system.

This application is a continuation-in-part of my application Serial No. 807,300, filed April 20, 1959, and now abandoned.

What is claimed is:

1. A process for preparing a carbon-to-carbon addition compound of an acetylenic compound and an amine which comprises heating at a temperature of at least about 50° C. and at a pressure of between 100 and 700 lbs./in.², an acetylenic compound of the formula R—C≡CH, in which R is selected from the group consisting of hydrogen and alkyl radicals, with a primary amine of the group consisting of alkylamines and cycloalkylamines which have the —$NH_2$ group attached directly to a carbon bearing at least one hydrogen atom, the said reactants being in contact with a dialkyl peroxide catalyst.

2. The process of claim 1 wherein the catalyst is ditertiary butyl peroxide.

3. The process of claim 1 wherein the acetylenic compound is acetylene.

4. The process of claim 1 wherein the amine employed is 1,4-diamino cyclohexane.

5. The process of claim 1 wherein the amine employed is isopropylamine.

6. The process of claim 1 wherein the amine employed is methylamine.

7. The process of claim 1 wherein the amine employed is ethylamine.

No references cited.